United States Patent [19]

Weaver

[11] Patent Number: 4,783,928

[45] Date of Patent: Nov. 15, 1988

[54] FISHING LURE

[76] Inventor: Brian Weaver, 575 Methodist Rd., Greenville, Pa. 16125

[21] Appl. No.: 174,153

[22] Filed: Mar. 28, 1988

[51] Int. Cl.⁴ .............................................. A01K 85/00
[52] U.S. Cl. ................... 43/42.24; 43/42.06; 43/42.26; 43/42.41
[58] Field of Search ............... 43/42.24, 42.26, 42.28, 43/42.06, 42.3, 42.36, 42.41

[56] References Cited

U.S. PATENT DOCUMENTS

| | | | |
|---|---|---|---|
| 3,389,490 | 6/1968 | Peters | 43/42.36 |
| 3,465,466 | 9/1969 | Showalter | 43/42.24 |
| 4,060,928 | 12/1977 | Messler | 43/42.24 |
| 4,073,084 | 2/1978 | Favron | 43/42.39 |
| 4,244,133 | 1/1981 | Martinek | 43/42.28 |
| 4,312,148 | 1/1982 | Hardwicke | 43/42.24 |
| 4,653,212 | 3/1987 | Pixton | 43/42.24 |

Primary Examiner—Gene P. Crosby
Attorney, Agent, or Firm—Harpman & Harpman

[57] ABSTRACT

An artificial fishing lure to simulate the natural movement and shape of live bait. The fishing lure is comprised of flexible resilient material with a hook being embedded in an end portion that forms the body configuration of the lure when engaged back upon itself. The end portion retains a spaced relation to the remaining body with engagement of the hook through the remaining body portion defining an opening within the lure.

4 Claims, 1 Drawing Sheet

FISHING LURE

BACKGROUND OF THE INVENTION

1. Technical Field

This invention relates to artificial fishing lures that mimick the movement and shape of naturally occurring bait in the wild.

2. Description of Prior Art

Prior Art devices of this type have relied on a variety of different body shapes and hook placement in and on flexible plastic resin or fixed bodies, see for example U.S. Pat. Nos. Des 259,504 and Des 270,750, also see U.S. Pat. Nos. 3,611,614 and 4,074,455.

In U.S. Pat. Des. 259,504 a fishing lure is disclosed having an elongated head and body portion with a flat tapered tail extending therefrom.

U.S. Pat. No. Des. 270,750 discloses a fishing lure having a solid ovaloid main body and a pair of long contoured tails extending in spaced parallel relation to one another in a random positioning manner. A hook extends from inside the body exiting at the back of the body adjacent the tail.

In U.S. Pat. No. 3,611,614 a fishing lure is disclosed having an elongated body member with a split tail portion. A hook is embedded within the body member and extends outwardly therefrom. The hook has a barb which is in spaced relation to the body member.

U.S. Pat. No. 4,074,455 shows a fishing lure having a soft plastic body with a plurality of small pockets on the outer surface. A flattened tail extends from the body and is of a flexible nature. The plurality of pockets trap air within giving the lure a shiny resilient appearance and movement. A hook is embedded in the body and extends outwardly therefrom.

SUMMARY OF THE INVENTION

A fishing lure that simulates a live bait in shape and movement is formed with a ovaloid opening within its main body imparting movement, characteristics and making the lure resistant to entanglement in weeds. A rigid fishing hook is embedded in an end portion of the lure defining the overall body shape and construction when curved back upon itself and secured by the hook to the remaining body portion.

DESCRIPTION OF THE PREFERRED EMBODIMENT

Figure 1:
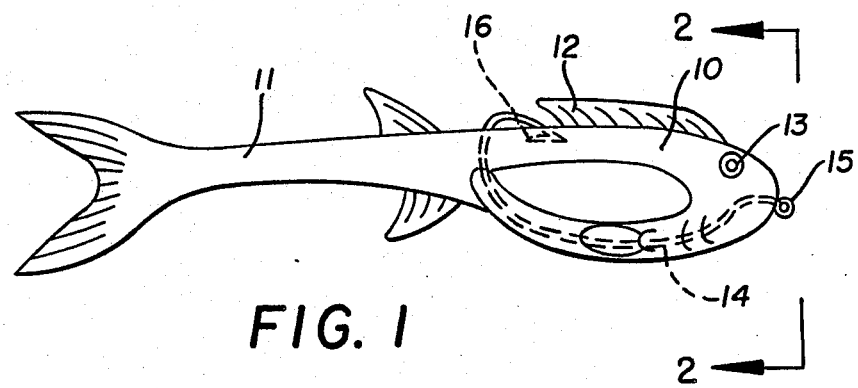
FIG. 1 is a side plan view of a fishing lure.
Figure 2:
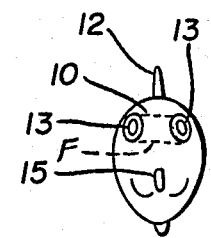
FIG. 2 is an end plan view on lines 2—2 of FIG. 1.

Referring to FIGS. 1 and 2 of the invention, a fishing lure is shown having an elongated body portion 10 and a tail portion 11 both of resilient, flexible, plastic resin material. The body portion 10 has a plurality of fish fins 12 and a pair of eyes 13 positioned thereon to help define a simulated live bait configuration. The body portion 10 is of varying transverse thicknesses having a rigid curved hook 14 positioned partly within. The hook 14 has an eylet 15 at one end and a barb 16 at the other end extending from a point midway along the body portion 10 and outwardly therefrom, as seen in FIG. 2 of the drawings. To form the lure, as seen in FIG. 1, the portion of the elongated body member 10 having the hook 14 within is bent back forwards and generally parallel with the remaining body portion 10 with the barb 16 of the hook 14 extending through the remaining body portion 10 at its juncture with the tail portion 11.

It will be evident from the above description that the body portion 10 with the hook 14 within forms the distinctive shape of the lure with the hook 14 actually holding the body portion 10 in the desired shape and securing thereto. Once the hook 14 passes through the body portion 10 it emerges and is engaged back into the body portion 10 concealing the barb 16 partially within. With the lure now formed, an opening is defined between the end portion of the body portion 10 and the remainder of the body portion 10 and this opening acts as a unique shape to contour the flow characteristics of the lure as it is pulled through the water. By placement of the hook 14 within the lure to hold the desired shape the lure is resistant to snagging which is a major problem of lures of this type with exposed hooks.

By deforming a portion of the end portion of the body 10 adjacent the entry of the hook 14 by bending, the eyes 13 will appear in proper position as in FIG. 1 after the lure is formed.

Figure 4:
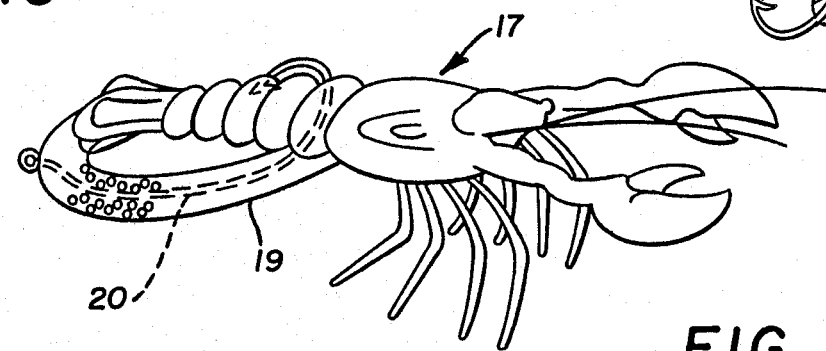
FIG. 4 is a perspective view of an alternate form of the fishing lure.
Figure 5:
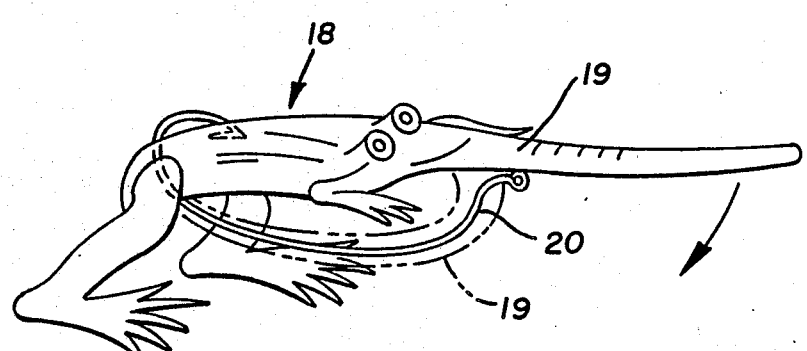
FIG. 5 is a perspective view of a second alternate form of the fishing lure.

Alternate forms of the invention can be seen in Figures 4 and 5 of the drawings showing a cray fish lure 17 and a frog lure 18 respectively. In each case an elongated body portion 19 has a hook 20 positioned within as described above so that the distinctive open body shape can be achieved.

Figure 3:
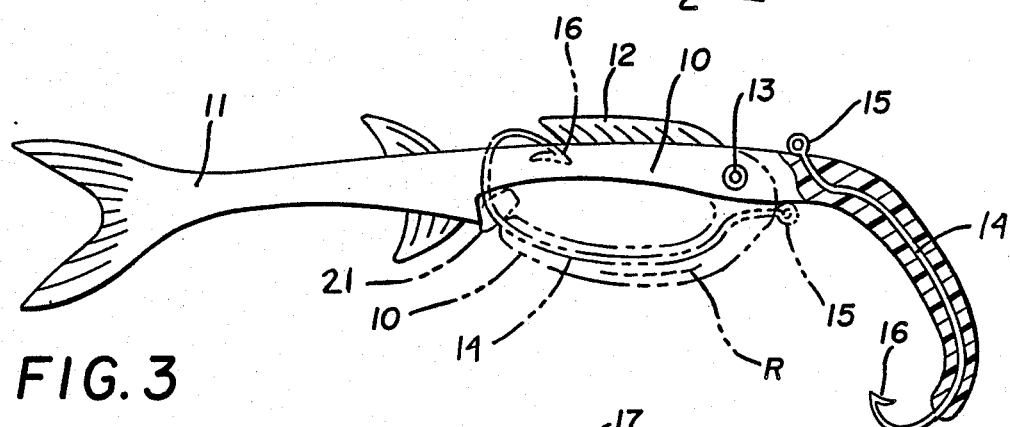
FIG. 3 is a side plan view of the fishing lure before formation.

It will also be evident that scent producing bait portions 21 (seen in broken lines in FIG. 3 of the drawings) or artificial scent material can be used in conjunction with the lure of the invention.

The bait portion 21 can be secured to the hook 14 by sliding the end portion of the body member 10 on the hook 14 and attaching the bait portion 21 thereon before the lure is finally formed by engagement of the barb 16 through the remaining body portion, as hereinbefore described.

It will be apparent to those skilled in the art that the lure of the invention can be used with a variety of lure enhancements. such as spinners, buzz bait, and spinner bait, etc. Additional enhancements to the lure are possible with the inclusion of a lead ribbon R seen in broken lines of FIG. 3 of the drawings to provide a desired weight addition to the lure to maintain a depth that which the lure is to travel through the water as is well understood by those skilled in the art.

A capsule shaped styrofoam float F can be seen in Figure 2 of the drawings positioned in the eyes 13 on the body portion 10 to enhance the overall relative gravity of the lure so as to help position the lure at a desirable depth.

In use, when a fish (not shown) strikes the lure of the invention the body portion 10 in which the barb 16 is engaged will distort due to the unsupported resilient nature exposing the barb 16 and lodge within the fish.

Thus, it will be seen that a new and novel artificial lure has been illustrated and described and that it will be apparent to those skilled in the art that various changes and modifications may be made therein without departing from the spirit of the invention, therefore

I claim:

1. An artificial fishing lure comprising a flexible resilient body portion and a tail portion, said body portion is elongated and is of varying transverse dimension along its length, a hook has an eyelet end and a barb end, said hook extending through an end portion of said body portion with said barb of said hook extending outwardly from the end of said end portion and intersecting said body portion at its junction with the tail portion defining an opening therebetween, said barb portion re-engaging said body portion adjacent said juncture of said body portion and said tail portions, means for securing a bait portion to said lure.

2. The artificial fishing lure of claim 1 wherein said body portion and said tail portion have a plurality of fins thereon.

3. The artificial fishing lure of claim 1 wherein said means for securing a bait portion to said lure comprises extending said barb of said hook through said bait portion positioned on said hook between said end of said end portion and said junction with said tail portion.

4. An artificial fishing lure comprising a flexible resilient body portion, a hook having a portion forwardly extending through an end portion of said body portion with said hook portion intersecting said body portion defining an opening between the end portion and the body portion, a lead ribbon positioned in said end portion and a flat positioned in said body portion.

* * * * *